UNITED STATES PATENT OFFICE.

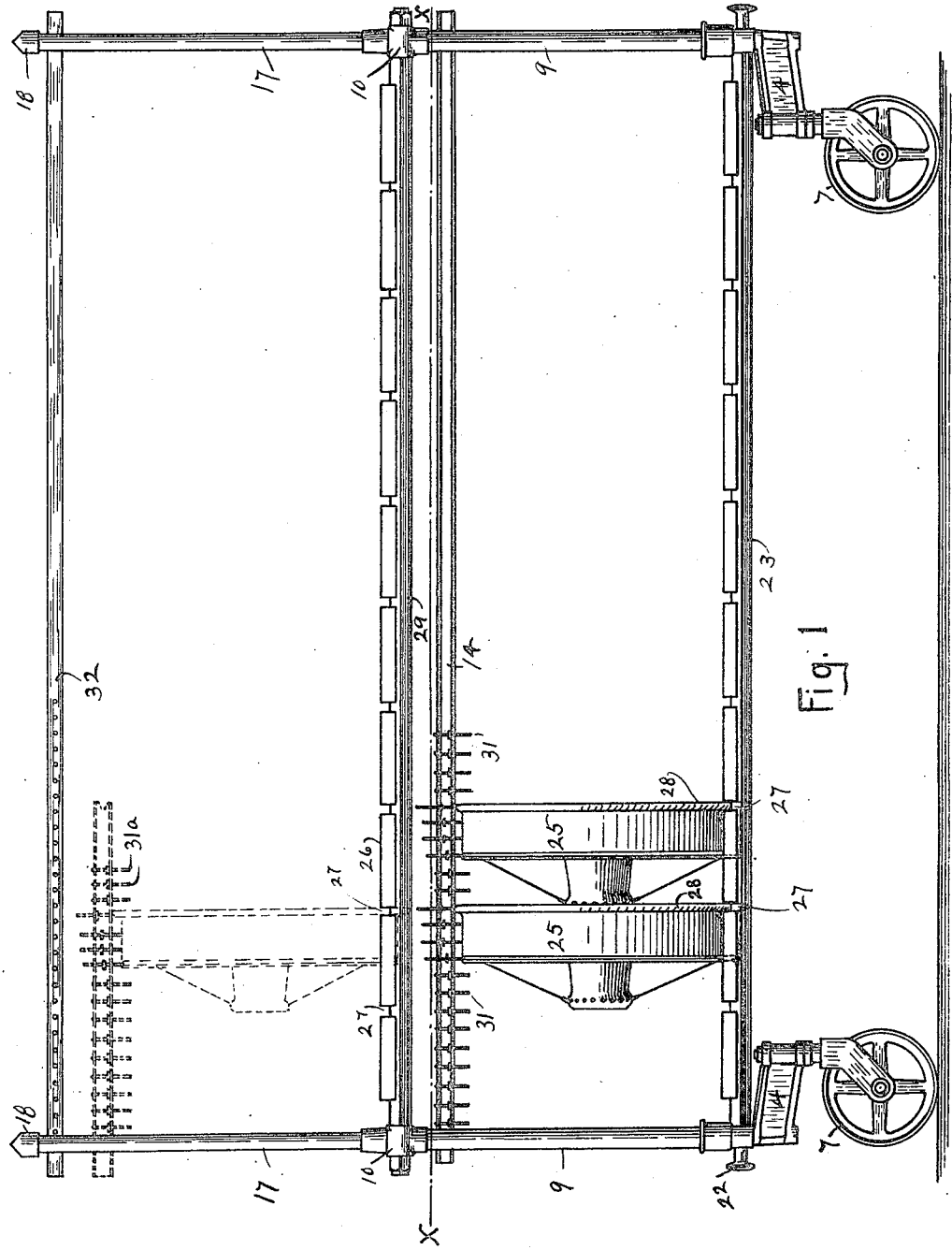

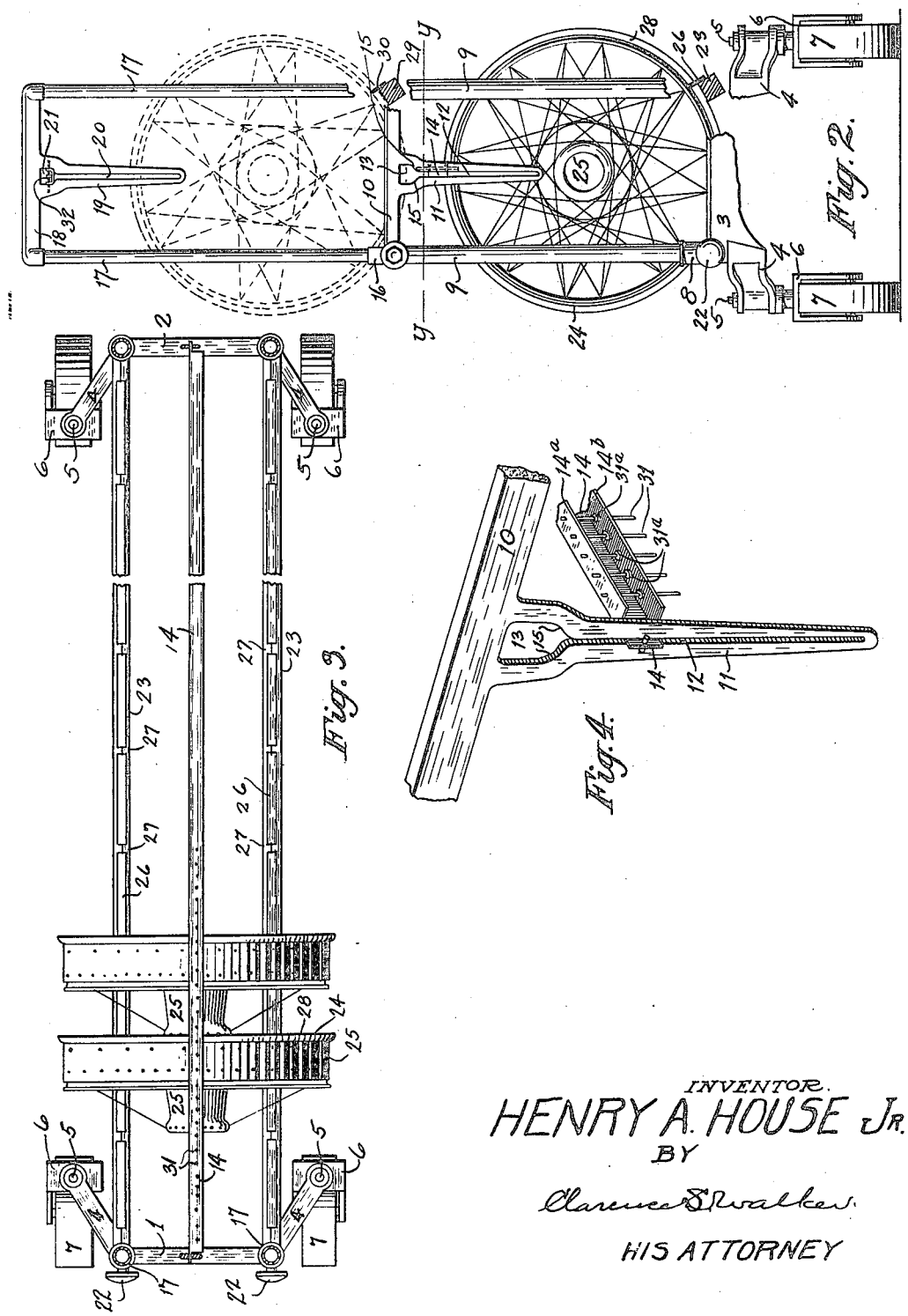

HENRY A. HOUSE, JR., OF BUFFALO, NEW YORK, ASSIGNOR TO WIRE WHEEL CORPORATION OF AMERICA, OF BUFFALO, NEW YORK, A CORPORATION OF NEW YORK.

PORTABLE WHEEL-RACK.

1,380,802.   Specification of Letters Patent.   Patented June 7, 1921.

Application filed September 4, 1918. Serial No. 252,670.

*To all whom it may concern:*

Be it known that I, HENRY A. HOUSE, Jr., a citizen of the United States, residing at Buffalo, Erie county, New York, have invented certain new and useful Improvements in Portable Wheel-Racks; and I do hereby declare the following to be a full, clear, and exact description of the said invention, such as will enable others skilled in the art to which it appertains to make and use the same, reference being had to the accompanying drawings, and to figures of reference marked thereon, which form part of this specification.

Like figures of reference refer to like parts.

One object of this invention is to provide portable means for supporting wheels or rims with as little contact with the supporting means as possible.

Another object is to supply a portable transporting means for readily receiving and discharging wheels or rims to facilitate the handling of the same.

Another object is to provide portable means for transporting the wheels or rims, having said means constructed for a systematic arrangement of the wheels or rims thereon.

A further object is to provide means in a portable wheel rack for readily engaging and holding the wheel rims in an upright position, automatically, as they are placed upon the rack.

And a further object is to provide, on said rack, a device for holding the said means out of engagement with the wheel or rims on said rack.

With these and other objects one embodiment of my invention is hereinafter described and is illustrated in the drawings and what I claim is set forth.

In the drawings,

Figure 1 is a side elevation of a portable wheel rack embodying my invention.

Fig. 2 is an end elevation and Fig. 3 is a sectional top plan of the rack shown in Fig. 1.

Fig. 3 is a plan of the device shown in Figs. 1 and 2.

Fig. 4 is a fragmental view of the slotted guide and a pin bar engaged therewith.

In the figures 1 and 2 are end frames of the portable wheel rack, which are identical in form and size. Each of these end frames comprises a base piece 3, having rigid arms 4, 4, extending out and slightly down from the said base piece 3. The end of each arm 4 is pivotally engaged by a pin 5, extending up from, and integral with, a forked member 6, in which is journaled a wheel 7. Upon each base piece 3, are two socket members 8, 8, each having fixed therein a column 9. To the top of the column 9 is fixed a cross member 10, having a downwardly extending slotted member 11. The slot 12, in the member 11, terminates in its upper end, in an expanded recess 13. Engaging the slot 12, is a pin bar 14, the thin ends of which slidably engage the slot 12. The recess 13 has shoulders 15, 15, upon which to rest the thin bar 14, when the same is raised from the slot 12, into the recess 13, and turned 90 degrees, so as to engage and rest upon the shoulders 15. The ends of the cross member 10, extend upward to form sockets 16, 16 from each of which rises a column 17. The upper ends of the column 17 being rigidly connected by a cross member 18, depending from the center of which is the slotted portion 19, having a slot 20 and a recess 21. Projecting outward from the base piece 3, are bumpers 22. The base pieces 3, 3, of the end frames 1 and 2, are rigidly connected in their lower parts by square bars 23, 23, which are parallel and spaced at a distance less than the outer diameter of the rim 24, of the wheel 25. These square bars 23, 23, are arranged to have their flat sides positioned at about 45 degrees with the vertical. Mounted upon each bar 23, on the outer upward space thereof, and extending upward and inward, is a flat notched piece 26, notched at 27, 27. Each notch 27 is made wide enough to receive the flange 28, of the rim 24.

Rigidly connecting the cross pieces 10, 10, of the end frames 1 and 2, are square bars 29, 29 on which are mounted notched flat strips 30, 30, similar to the flat bars 26, 26, mounted on the other square bars 23, 23. Loosely engaging slots 12, in the slotted member 11, is the pin bar 14, which is channel shaped in section, as is shown in perspective in Fig. 4. This pin bar 14 is transversely engaged by a series of pins 31, 31, passing loosely through holes in the legs 14ᵃ and 14ᵇ, of the pin bar 14. Each pin 31, 31, is prevented from passing through these holes by its ring portion 31ᵃ. A similar pin bar 32 engages the slotted portions 19 of the cross members 18, in the upper part of the wheel rack.

When using the wheel rack, the pin bars 14 and 32 are first lifted into their respective recesses, 13 and 21, from their respective slots, 12 and 20, and are turned to have the pin bars horizontal so that the pin bars will rest upon the shoulders of the said respective recesses. Wheels or rims are next put upon the respective pairs of square bars, 23 and 29, or either pair, as required, to have the axis of each rim horizontal, so that the flanges of the rims occupy the recesses, such as 27. After the rack has been loaded, as desired, the pin bars are released in turn to descend into the respective slots, 12 and 20, until the bars rest upon the flanges of the rims, and the pins 31, 31, engage the upper parts of the rims, the pins being automatically adjustable to the transverse outer contour of the rims, whereby the irregularities thereof, whether they be pockets or humps present sides to the pins, to rigidly engage each rim, transversely, and maintain the individual wheel rims in vertical position, while the rack is being transported where desired.

When releasing the wheels or rims from the rack, the pin bars are raised again to occupy the respective recesses, 13 and 21, and are turned to be lodged upon the shoulders thereof, to hold them up from the rims, after which the wheels or rims are readily discharged transverse to the rack.

Other seating means than the pairs of square bars, referred to, and other releasable means than the pin bars and pins for engaging the upper parts of the rims, as they stand with the rims engaging notches may be used, I therefore do not wish to be confined to the details of construction herein shown and described, as modifications therein may be made without departing from the spirit and scope of my invention.

Having described my invention, I claim,

1. In a wheel rack comprising a frame work including parallel supporting bars adapted to support a plurality of wheels thereon, a longitudinal bar in sliding engagement with said frame, a series of pins on said bar adapted for longitudinal reciprocation transverse to said bar, and adapted to hold the upper parts of said wheels in releasable engagement therewith.

2. A rack for wire wheels comprising fixed parallel notched members which engage the flanges of the wheels and support the same in a definite position and a longitudinal freely movable bar which bears upon the wheels so supported and prevents tipping.

3. A rack for supporting a plurality of wire wheels in upright position out of contact with each other comprising stationary means for holding the lower edges of the wheels and movable means engaging the tops of the wheels to prevent tipping.

4. A rack for supporting a plurality of wire wheels in upright position out of contact with each other comprising stationary means for positioning the wheel and a longitudinally movable bar having longitudinally reciprocating pins for engaging the wheels at a plurality of points to prevent tipping.

5. In a wheel rack a bar mounted so as to be freely movable longitudinally to hold wheels of any size and pins mounted in said bar and capable of reciprocating freely in a longitudinal direction for engaging the wheels at a plurality of points.

HENRY A. HOUSE, Jr.